April 5, 1966  W. L. BOWEN III, ETAL  3,244,463
HARDENED LINER FOR ANTI-FRICTION BEARING AND SPLIT HOUSING
Filed Dec. 6, 1961
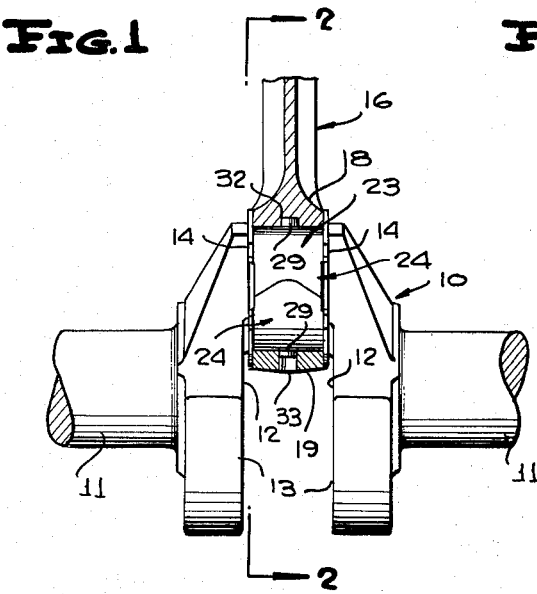
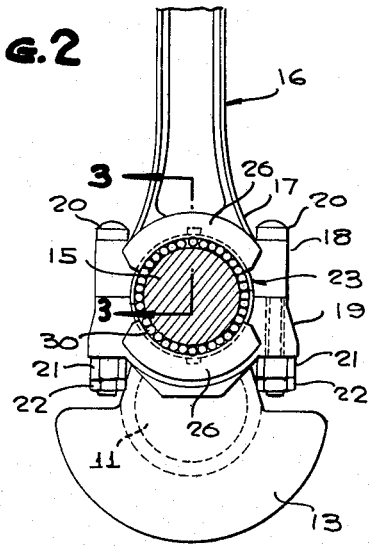
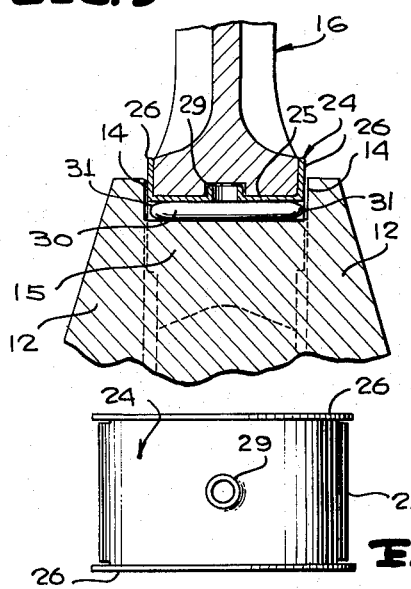
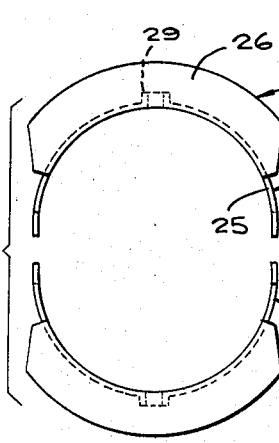
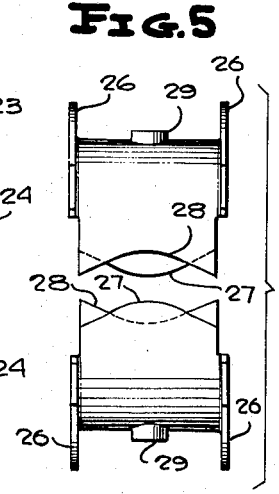
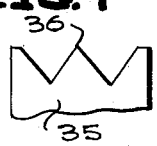
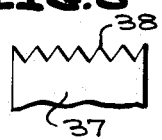
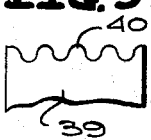
INVENTORS
WILLARD L. BOWEN III
& JOHN H. COWLES
BY
ATTORNEYS

United States Patent Office 3,244,463
Patented Apr. 5, 1966

3,244,463
HARDENED LINER FOR ANTI-FRICTION
BEARING AND SPLIT HOUSING
Willard L. Bowen III, Harwinton, and John H. Cowles,
Forestville, Conn., assignors to The Torrington Company, Torrington, Conn., a corporation of Maine
Filed Dec. 6, 1961, Ser. No. 157,342
13 Claims. (Cl. 308—35)

This invention relates in general to new and useful improvements in bearing construction, and more particularly to an anti-friction bearing to be utilized with components which are of insufficient hardness to have anti-friction bearing elements, such as rollers, in rolling contact therewith.

There exist at the present time many bearing installations utilizing friction type bearings wherein it is desired to utilize anti-friction bearings, but because of either the cost or manufacturing problems, or both, antifriction bearings have not been feasible. The customary type of bearing requires two hardened surfaces on which the anti-friction bearing elements can roll. There are many instances where it will be feasible and highly desirable to utilize needle bearings or roller bearings if sufficiently hard surfaces were available on which these bearings could roll. Normally, the shaft is formed of a sufficiently good quality material wherein it may be readily hardened to provide the necessary inner race surface for needle and roller bearings. On the other hand, in most instances, either the split bearing housing receiving and supporting the bearings is formed of material which cannot be readily hardened to the required hardness to provide an outer race surface for the bearings or the hardening procedure is too expensive to be practical. As a result, in a majority of such installations, the bearings are of the friction type and include either a suitable bearing material cast into the bearing housing, or a bearing insert which includes a friction type bearing layer over a steel backing. This type of bearing, of course, is not as desirable as an anti-friction bearing.

In view of the foregoing, it is the primary object of this invention to provide a liner for split bearing housings receiving shaft journals having hardened surfaces, the liner being hardened and presenting an inner surface which is suitable as an outer race for rollers, and which liner is split wherein, upon removal of one half of the split housing, the rollers may be readily assembled around the shaft journal and within the split housing.

Another object of this invention is to provide a novel anti-friction bearing for use in conjunction with a split housing wherein the material of the housing either cannot be sufficiently hardened to function as an outer race for needle or roller bearings, or it is not feasible to do so, the anti-friction bearing including a two-piece split liner which may be readily inserted into and retained in a split housing, the split liner forming a hardened outer race surface and carrying a plurality of needle or roller bearings for direct engagement with a hardened surface of an associated shaft.

Another object of this invention is to provide a novel split liner for use in conjunction with split housings of the type formed of material which either cannot be hardened sufficiently to have direct contact with rolling anti-friction elements, or wherein it is not feasible to harden the normal bearing surfaces of such split housings, the liner being formed of two identical halves with each of the liner halves including a semi-cylindrical race portion and reinforcing flanges extending from opposite ends of the race portion for reinforcing and stiffening the race portion against distortion.

Another object of this invention is to provide a thin, relatively inexpensive bearing liner which may be readily inserted in a split bearing housing to function as the outer race for needle and roller bearings, the cost of the bearing liner being low in comparison to the cost of hardening the material of the split housing wherein the liner may be utilized to provide a split bearing housing with an outer race surface at a cost much less than that heretofore possible.

A further object of this invention is to provide a novel split liner for use in conjunction with a split housing, the split liner being formed of identical halves with each of the halves having side flanges adapted to engage the two halves of the split housing, and the ends of the liner halves having complementary projections and recesses wherein when the liner halves are drawn together, the liner halves will automatically align with each other and in so aligning with each other, will align the split housing halves whereby the necessity for dowel pins or tight fitting securing bolts is eliminated, and in this manner, the cost of manufacture of the split housing is greatly reduced.

A still further object of this invention is to provide a novel split liner for use as an outer race in a split bearing housing, the split liner being formed of two identical halves with each half having one edge thereof in the general form of a V-shaped projection, the projection being either singular or multiple, and the other edge thereof in the general form of a V-shaped recess, the two edges being complemental, whereby when two of the liner halves are placed together, a complete bearing surface will be formed with the line of juncture of the bearing surface being diagonally disposed and extending in opposite directions on the opposite side of a center line of the liner half.

A typical application of this invention can be found in internal combustion engines. In the customary internal combustion engine construction, the bearings for the journals of the crankshaft, both the main journals and the pin journals, generally are of the friction type, including a steel backing and a layer of suitable bearing material. This bearing, of course, is not as desirable as an anti-friction bearing. In order to overcome the undesirable characteristics of the usual type of bearing utilized in internal combustion engines, rollers have been utilized with respect to the journals of crankshafts. While this type of anti-friction bearing has been successful, particularly in small internal combustion engines, such a bearing assembly has required not only the use of very hard throws on the crankshaft, but also expensive forged steel connecting rods which have been hardened and ground.

In addition, the crankcase assemblies or blocks, as the case may be, of internal combustion engines are normally formed of a cast metal, and it is not feasible to harden the split bearing portions thereof. It has therefore not been feasible to provide the main journals of crankshafts with anti-friction bearings even though the crankshaft journals could be hardened. While this situation is true in conjunction with the customary cast iron engine blocks, it is more particularly true with respect to new engine constructions wherein the crankcases and blocks are formed of aluminum and in some cases, magnesium.

In view of the foregoing, it is another object of this invention to provide a novel split liner to function as an outer race of an anti-friction bearing, the split liner being of a type wherein it may be readily assembled in internal combustion engine components so as to make the use of anti-friction bearings in conjunction with the crankshaft journals of an internal combustion engine commercially feasible.

A further object of this invention is to provide a novel split liner for use in conjunction with the crankshaft end of a connecting rod, the split liner being formed of two identical halves with each half including a cylindrical race portion and a pair of outwardly extending flanges, the flanges being disposed at opposite ends of the race portion, and the race portion and the flanges all having hardened bearing surfaces wherein the race portion may engage needle or roller bearings and the flanges may engage cheeks of a crankshaft without excessive wear.

A still further object of this invention is to provide a novel split liner for a split connecting rod end, the liner being formed of identical halves with each of the halves having an outwardly directed projection for aligning the liner half with a connecting rod bearing portion, the projections being tubular wherein the needle or roller bearings disposed within the liner may be lubricated through the projections.

A still further object of this invention is to provide a novel split liner for use in conjunction with split housings formed of materials wherein it is either not possible or is commercially impractical to provide sufficiently hardened bearing surfaces to permit the rolling contact of anti-friction bearing elements thereon, the split liner being formed of identical halves wherein each half is formed of relatively inexpensive sheet metal shaped to the desired configuration and having the bearing surface thereof hardened.

With the above and other objects in view that will hereinafter appear, the nature of the invention will be more clearly understood by reference to the following detailed description, the appended claims and the several views illustrated in the accompanying drawing.

In the drawing:

FIGURE 1 is a fragmentary elevational view of a connecting rod and crankshaft assembly showing a typical application of the present invention, and with a portion of the connecting rod being broken away and shown in section in order to illustrate the general details of the liner disposed therein.

FIGURE 2 is a vertical sectional view taken along the line 2—2 of FIGURE 1, and shows the specific details of the anti-friction bearing between the connecting rod and the crankshaft.

FIGURE 3 is an enlarged fragmentary vertical sectional view taken along the line 3—3 of FIGURE 2, and shows the specific details of the anti-friction bearing and the relationship of the connecting rod with respect to the crankshaft.

FIGURE 4 is an elevational view of an enlarged scale of the liner for the connecting rod, the two halves of the liner being separated.

FIGURE 5 is an elevational view showing the separated halves of the liner of FIGURE 4 from the connecting rod engaging surfaces thereof.

FIGURE 6 is a plan view of one of the liner halves on an enlarged scale.

FIGURES 7, 8 and 9 are fragmentary elevational views of the end portions only of modified forms of liners and show the configurations of the end portions thereof.

At this time, it is again pointed out that the present invention has general application for all types of split bearing housings, and is not limited to any particular general class of mechanisms. The use of the liner is not limited to any particular type of material or metal in that it can be readily used in conjunction with either materials which cannot be hardened sufficiently to provide the necessary roller bearing surfaces, or materials wherein the necessary hardening could be obtained but wherein the present bearing liner will provide an equal or better roller bearing surface at a lesser cost.

Referring now to the drawing in detail, it will be seen that there has been illustrated a typical use of the present invention. In FIGURE 1 there is illustrated a conventional type of one-piece crankshaft which is generally referred to by the numeral 10. The crankshaft 10 includes main journals 11 to which there are integrally connected crank plates 12 having counterweight portions 13. The plates 12 define crank cheeks 14 which are disposed in opposed relation and between which there extends a connecting rod journal 15. A connecting rod, generally referred to by the numeral 16, is carried by the journal 15.

The connecting rod 16 has a crank end 17 which is of the split type and includes an integral portion 18 and a removable cap 19, the cap being secured to the integral portion 18 by means of bolts 20 which are provided with nuts 21 and lock nuts 22. It is to be understood that the connecting rod 16 is formed of a metal which either cannot be hardened sufficiently to have anti-friction elements in direct rolling contact therewith, or it is expensive to so harden the metal as compared to the cost of a liner formed in accordance with this invention. The connecting rod 16 may be formed of steel, or, when desired, could be formed of light weight metals such as aluminum and magnesium. When aluminum or magnesium connecting rods are utilized, the lightness of the connecting rod 16 is very desirable in that in high speed internal combustion engines, reciprocating weights must be held to a minimum.

In accordance with this invention, the crank end 17 of the connecting rod 16 is provided with a split liner, generally referred to by the numeral 23. The split liner 23 is formed of two identical liner halves 24. The liner halves 24 are disposed in the integral portion 18 and the cap 19, respectively, of the connecting rod 16.

Each liner half is formed of sheet metal shaped to define a semi-cylindrical outer race portion 25 having a pair of reinforcing flanges 26. The reinforcing flanges 26, as is best shown in FIGURES 4, 5 and 6, are disposed at opposite ends of the semi-cylindrical race forming portion 25 and extend outwardly therefrom in generally parallel relation. It is to be noted that the reinforcing flanges 26 extend throughout a major portion of the circumferential extent of the semi-cylindrical race forming portion 25.

In order to provide a substantially continuous race surface, one end of each liner half is provided with a projecting V-shaped edge 27 and the opposite end thereof is provided with a recessed V-shaped edge 28, the edges 27 and 28 being complemental. It will thus be seen that when the liner halves 24 combine to define the liner 23, the liner halves are interlocked and a diagonal line of juncture is provided as opposed to the usual straight line juncture between a connecting rod cap and the integral portion of the end of the connecting rod which define the race for rollers.

Each liner half also includes a tubular projection 29. The tubular projection 29 has a two-fold purpose. In the first place, the projection 29 is utilized for the purpose of anchoring the liner half with respect to the connecting rod. In the second place, the tubular portion 29 defines an oil passage to facilitate the lubrication of the rollers carried by the liner 23.

It is to be understood that the journal 15 is hardened in that rollers 30 surround and bear against the journal 15, and have rolling contact therewith. It is also desirable that the crank cheeks 14 be hardened in that the ends of the rollers 30 will engage the crank cheeks 14. In order to facilitate the movement of the rollers 30 relative to the crank cheeks 14, it will be noted that the rollers 30 have rounded ends 31. The length of the rollers 30 is slightly less than the spacing between the crank cheeks 14.

The liner 23, which is economically formed of sheet metal which is hardened to the desired degree, has one half 24 thereof snapped in the integral portion 18 of the connecting rod 16 and the other half snapped in the cap 19. It is to be noted that the width of both the integral portion 18 and the cap 19 is equal to the spacing between the flanges 26 so that the liner halves 24 are frictionally held within the integral portion 18 and the cap 19. Further, rotational movement of the liner halves 24 with respect to the integral portion 18 and the cap 19 is prevented by the tubular projections 29. The connecting rod 16 is provided with a recess 32 which receives the projection 29 of the associated liner half 24. The cap 19, on the other hand, is provided with a bore 33 therethrough in which the tubular projection 29 of the associated liner half 24 is received. Thus, the tubular projection 29 for the cap 19 not only serves to position the liner half 24 within the cap 19, but also serves to provide a passage for the flow of lubricant into the bearing.

Attention is now directed to FIGURE 3 in particular wherein it will be seen that the spacing between the outer surfaces of the flanges 26 is slightly less than the spacing between the crank cheeks 14. Normally, the flanges 26 will not engage the crank cheeks 14, but whenever there is an end thrust, there will be a slight relative shifting between the connecting rod 16 and the crankshaft 10 with the result that one of the reinforcing flanges 26 will engage a respective one of the crank cheeks 14. The surfaces of the crank cheeks and the flanges 26 being hardened, the resultant wear will be negligible.

Attention is directed to the fact that the race forming portions 25 of the liner halves 24 have an extent in excess of 180 degrees. It is therefore necessary that the liner halves be snapped in place. However, when the cap 19 is drawn up onto the integral portion 18 of the connecting rod, the projecting end portions of the liner halves 24 will be drawn in to define a true cylinder. It will be seen that due to the sloping edges, the liner halves will have diagonal parting lines so that at no time will the rollers 30 have a full line contact with the parting line between the liner halves.

Although the simplest form of the invention will be to provide the liner halves with V-shaped projections and recesses, as is particularly shown in FIGURE 5, it is to be understood that other end configurations may be provided for the liner. For example, in FIGURE 7, the liner half 35 illustrated therein is provided with a multiple V-shaped edge configuration 36 which is preferably of a twin V-shaped or W-shape, although the number of V-shaped configurations may be in excess of two. On the other hand, as is shown in FIGURE 8, a liner half, such as the liner half 37, may be provided with an end portion having a straight line serrated configuration, as at 38. A further modification of liner end construction is illustrated in FIGURE 9, wherein the liner 39 is provided with a curved serrated edge surface 40. It is to be understood that the liners 35, 37 and 39 will have opposite ends of a complementary edge configuration wherein two of each of the liner haves may be interlocked as described above with respect to the liner 23.

It is to be noted that inasmuch as the liner halves are provided with flanges which are tightly fitted within their respective portions of a connecting rod, including the connecting rod cap, when the liner halves are brought into alignment by the interlocking of the ends thereof, the cap of the connecting rod is automatically brought into alignment with the remaining portion of the connecting rod. As a result, the necessity for either dowel pins or tight-fitting connecting rod bolts for alignment purposes is eliminated. This will, course, reduce the cost of manufacture of the connecting rod and cap assembly.

From the foregoing, it will be seen that by providing the relatively inexpensive liner, the connecting rod of an internal combustion engine may economically be provided with an anti-friction bearing. It is not necessary that the connecting rod be formed of an expensive material which may be readily hardened, or a relatively inexpensive material which can be hardened by an expensive process. As a result, the connecting rod may be provided with an anti-firiction bearing even though it is formed of a relatively inexpensive iron or steel forging which may not be readily hardened, or is formed of a light weight metal, such as aluminum or magnesium. In addition to permitting the use of anti-friction bearings, the liner also permits the light weight metals to be used in the formation of connecting rods, which use is highly desirable in high speed engines in that it reduces the reciprocating forces within the engines.

Although the anti-friction bearing, including the liner which is the specific subject of this invention, has been specifically illustrated and described in conjunction with a connecting rod of an internal combustion engine, it is to be understood that the bearing construction may equally as well be used with all types of split bearing housings. Although it is not feasible to form connecting rods of many metals and other materials, it is feasible to form bearing housings of relatively inexpensive materials or materials which may be readily molded, such as plastics, and it is therefore to be understood that the invention is not limited in use to either material or machine element arrangement, but is of a general application to split bearing housings.

From the foregoing, it will be seen that novel and advantageous provision has been made for carrying out the desired end. However, attention is directed to the fact that variations may be made in the example bearing structure disclosed herein without departing from the spirit and scope of the invention, as defined in the appended claims.

We claim:

1. The combination of a split bearing housing and a bearing assembly, said split bearing housing including a removable portion, said bearing assembly including a split hardened steel liner with one half of said split liner being carried by each half of said split bearing housing, each said liner halves having reinforcing flanges at opposite ends thereof engaging outer faces of said split bearing housing, said liner being in the form of an outer bearing race and having an inner hardened bearing surface, rollers disposed within said liner and engaging said bearing surface, said split bearing housing including bolts releasably securing said bearing housing halves together, said bolts being loosely received in one of said bearing housing halves, and said liner halves having interlocking ends aligning said split bearing housing halves.

2. The combination of connecting rod and bearing race liner wherein said connecting rod is formed of a soft metal as compared to hardened steel and has a split bearing receiving end including an integral portion and a removable cap, said split bearing receiving end having crankshaft opposing portions, a split hardened steel liner in said connecting rod split end, one half of said liner being carried by said integral connecting rod portion and the other half of said liner being carried by said cap, each of said liner halves having reinforcing flanges at opposite ends thereof engaging opposite faces of said connecting rod end, said liner being in the form of an outer bearing race and completely encasing said crankshaft opposing portions of said connecting rod, said integral portion carrying bolts releasably securing said cap in place, said bolts being loosely received in said cap, and said liner halves having interlocking ends aligning said cap with said integral portion.

3. An outer race forming liner for a split machine element, said liner being formed in two halves, each of said liner halves being of a one-piece sheet metal substantially uniform thickness sheet metal construction and including a generally semi-cylindrical race portion and a pair of parallel race portion form retaining reinforcing flanges, said flanges being disposed in bent relation to said race portion at opposite axial ends of said race portion and extending radially outwardly therefrom, said race portion having a hardened inner bearing surface and said reinforcing flanges having hardened outer bearing surfaces.

4. The liner of claim 3 wherein said flanges terminate materially short of the circumferential ends of said race member.

5. The liner of claim 3 wherein each flange is joined to the respective race portion by a small radius bend.

6. A bearing assembly for use with a split machine element, said bearing assembly comprising an outer race forming liner and a plurality of roller type bearing elements carried by said liner, said liner being formed in halves with each liner half being of a one-piece sheet steel construction and including a generally semi-cylindrical race portion, and race portion for retaining reinforcing flanges extending outwardly from said race portion at opposite ends of said race portion, said race portion having a hardened inner bearing surface with which said rollers have rolling contact, said liner halves having interlocking edges with the mating surfaces of the liner edges being along lines disposed in angular relation to the line of rolling contact between a roller and said liner at the intersection of said liner halves, and said reinforcing flanges having hardened outer bearing surfaces for rubbing contact with a relatively moving second machine element.

7. The combination of claim 6 wherein said split bearing housing halves have recesses, and said liner halves have projecting portions seated in said recesses and locking said liner halves against rotational movement in said bearing housing, at least one of said split bearing housing recesses extending entirely through the respective one of said split bearing housing halves, and said liner half projecting portions being tubular whereby lubricant flows through said split bearing housing and said liner.

8. The combination of a split bearing housing and a bearing assembly, said split bearing housing including a removable portion, said bearing assembly including a split hardened sheet steel liner with one half of said split liner being carried by each half of said split bearing housing, each of said liner halves having reinforcing flanges at opposite ends thereof engaging outer faces of said split bearing housing, said liner being in the form of an outer bearing race and having an inner hardened bearing surface, said reinforcing flanges extending radially outwardly beyond that required to position said liner in said bearing housing and retaining the shape of said inner hardened bearing surface, rollers disposed within said liner and engaging said bearing surface, said reinforcing flanges having hardened outer bearing surfaces, and a shaft rotatably journaled within the bearing assembly, the shaft having a hardened surface engaged with said rollers, and said shaft having opposed cheeks closely spaced with respect to said reinforcing flanges and engageable in rubbing contact with said reinforcing flanges outer bearing surfaces whereby relative endwise movement of said bearing housing and said shaft is restricted.

9. The liner of claim 8 wherein each flange terminates materially short of the line of split of said bearing housing.

10. In an internal combustion engine the combination of a crankshaft having a hardened journal and crank cheeks at opposite ends of said journal, a soft as compared to hardened steel metal connecting rod having a split end including an integral connecting rod portion and a removable cap, said connecting rod split end surrounding said journal and being removable therefrom, a split hardened sheet steel liner in said connecting rod split end, one half of said liner being carried by said integral connecting rod portion and the other half of said liner being carried by said cap, each of said liner halves having reinforcing flanges at opposite ends thereof engaging opposite faces of said connecting rod end, said reinforcing flanges having hardened outer surfaces opposing said crank cheeks to prevent any direct engagement of the relatively soft connecting rod with said crank cheeks and providing hardened wear surfaces for engagement with said crank cheeks, and rollers disposed between said journal and said liner with said journal acting as an inner race and said liner acting as an outer race, said reinforcing flanges extending radially outwardly beyond that required to position said liner in said connecting rod and retaining the shape of said liner not withstanding the softness of the metal of said connecting rod.

11. The liner of claim 10 wherein each flange terminates materially short of the line of split of said connecting rod.

12. The combination of connecting rod and bearing race liner wherein said connecting rod is formed of a soft metal as compared to hardened steel and has a split bearing receiving end including an integral portion and a removable cap, said split bearing receiving end having crankshaft opposing portions, a split hardened sheet steel liner in said connecting rod split end, one half of said liner being carried by said integral connecting rod portion and the other half of said liner being carried by said cap, each of said liner halves having reinforcing flanges at opposite ends thereof engaging opposite faces of said connecting rod end, said liner being in the form of an outer bearing race and completely encasing said crankshaft opposing portions of said connecting rod, said reinforcing flanges extending radially outwardly beyond that required to position said liner in said connecting rod and retaining the shape of said liner not withstanding the softness of the metal of said connecting rod.

13. In an internal combustion engine the combination of a crankshaft having a hardened journal and crank cheeks at opposite ends of said journal, a soft as compared to steel and light weight metal connecting rod having a split end including an integral connecting rod portion and a removable cap, said connecting rod split end surrounding said journal and being removable therefrom, a split hardened sheet steel liner in said connecting rod split end, one half of said liner being carried by said integral connecting rod portion and the other half of said liner being carried by said cap, each of said liner halves having reinforcing flanges at opposite ends thereof engaging opposite faces of said connecting rod end, said reinforcing flanges having hardened outer surfaces opposing said crank cheeks to prevent any direct engagement of the relatively soft connecting rod with said crank cheek and providing hardened wear surfaces for engagement with said crank cheeks, and rollers disposed between said journal and said liner with said journal acting as an inner race and said liner acting as an outer race, said reinforcing flanges extending radially outwardly beyond that required to position said liner in said connecting rod and retaining the shape of said liner notwithstanding the softness of the metal of said connecting rod.

References Cited by the Examiner

UNITED STATES PATENTS

| 1,398,049 | 11/1921 | Swayze | 308—237 |
| 1,644,611 | 10/1927 | Rieffert | 308—216 X |
| 1,790,253 | 1/1931 | Taylor | 308—216 |
| 1,821,873 | 9/1931 | Best | 308—216 X |
| 1,921,488 | 8/1933 | Smith | 308—216 |
| 2,053,534 | 9/1936 | Robinson | 308—179 |
| 2,124,060 | 7/1938 | Gilman | 308—237 |
| 2,145,864 | 2/1939 | Denneen. | |
| 2,614,897 | 10/1952 | Kircher et al. | 308—35 |
| 2,624,645 | 1/1953 | Virtue | 308—216 |
| 2,682,435 | 6/1954 | Rien et al. | 308—216 X |
| 2,696,411 | 12/1954 | Kircher | 308—179 |
| 2,800,809 | 7/1957 | Pike | 308—179 |
| 2,894,791 | 7/1959 | White et al. | 308—212 |
| 3,007,754 | 11/1961 | Cross | 308—237 |

FOREIGN PATENTS 960,514   3/1957   Germany.

OTHER REFERENCES

Latest Developments in Engine Bearings: published in "Automotive and Aviation Industries," March 1, 1947, pages 28 to 31 and 58 to 60.

DAVID J. WILLIAMOWSKY, *Primary Examiner.*

RICHARD A. DOUGLASS, FRANK SUSKO,
*Examiners.*

ROBERT C. RIORDON, F. C. HAND,
*Assistant Examiners.*